J. F. O'CONNOR.
FRICTION DRAFT RIGGING FOR RAILWAY CARS.
APPLICATION FILED FEB. 15, 1907.
909,445.
Patented Jan. 12, 1909.
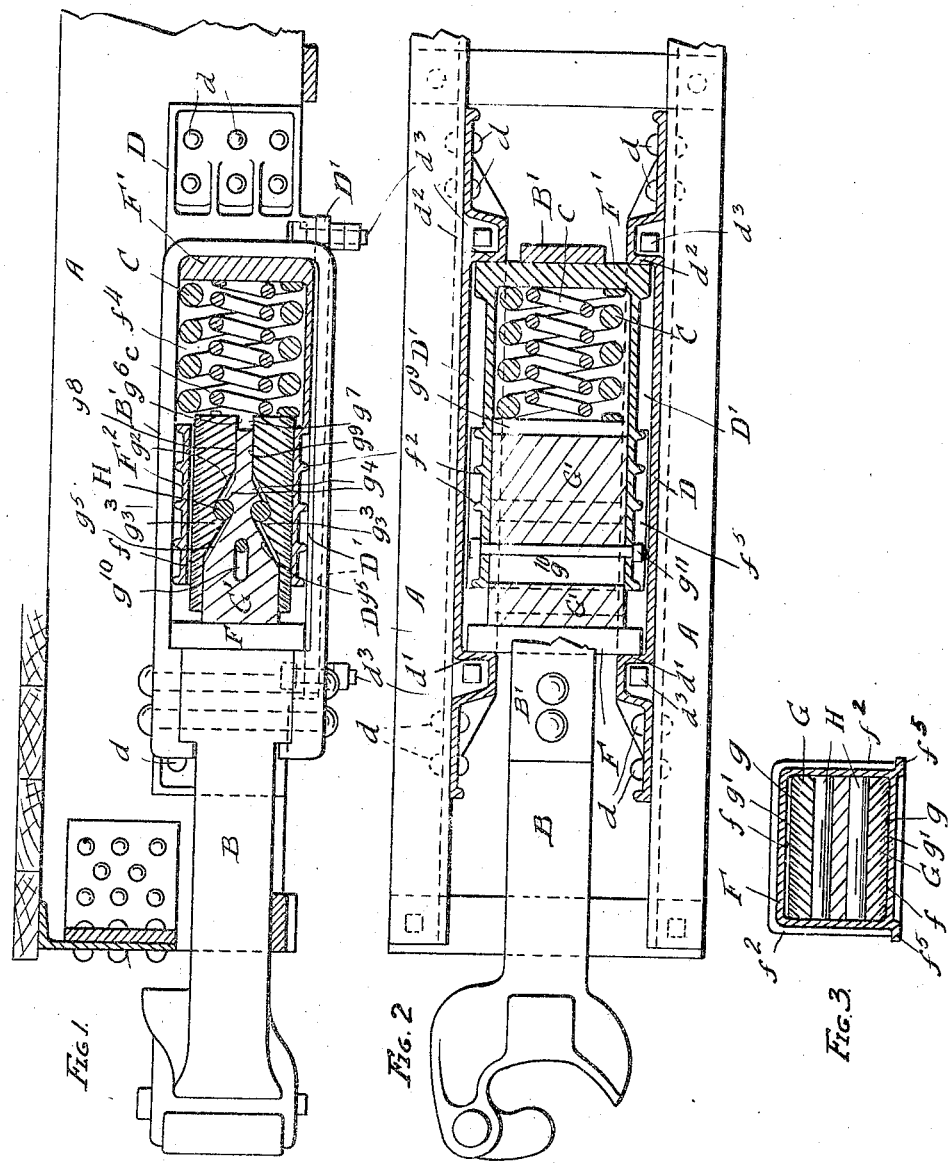
WITNESSES:
F. B. Townsend
Wm. Geiger
INVENTOR:
John F. O'Connor
By Munday, Evarts, Adcock & Clarke
ATTORNEYS

UNITED STATES PATENT OFFICE.

JOHN F. O'CONNOR, OF CHICAGO, ILLINOIS, ASSIGNOR TO W. H. MINER COMPANY, OF CHICAGO, ILLINOIS, A CORPORATION OF ILLINOIS.

FRICTION DRAFT-RIGGING FOR RAILWAY-CARS.

No. 909,445.

Specification of Letters Patent.

Patented Jan. 12, 1909.

Application filed February 15, 1907. Serial No. 357,528.

*To all whom it may concern:*

Be it known that I, JOHN F. O'CONNOR, a citizen of the United States, residing in Chicago, in the county of Cook and State of Illinois, have invented a new and useful Improvement in Friction Draft-Rigging for Railway-Cars, of which the following is a specification.

My invention relates to friction spring draft rigging for railway cars.

The object of my invention is to provide a draft rigging of a simple, strong, safe, efficient and durable construction, having both a direct acting spring cushioning member longitudinally arranged in the line of the draw-bar, and also frictional cushioning devices with longitudinally extending friction faces parallel to the draw-bar and coöperating with the direct acting longitudinally arranged spring and a wedge or spreader device, and by means of which the tendency, and by which the objections heretofore experienced from the wedge and friction devices sticking and acting with uncertainty and irregularity, and thus reducing the effective cushioning action of the friction devices may be practically overcome without in any way interfering with the strength, efficiency, durability and reliability of the draft rigging as a whole.

My invention consists in the means I employ to practically accomplish this object or result. That is to say, it consists in connection with the draw-bar and its yoke, and the coöperating stationary stops or stop castings on the car frame or sills, of a direct acting longitudinally arranged spring, a longitudinally movable friction shell fitting within the draw-bar yoke and having a longitudinally extending interior friction face or faces, a plurality of coöperating friction blocks having longitudinally extending exterior friction faces in sliding frictional engagement with the interior friction face or faces of the friction shell and arranged in the line of the draw-bar and acted upon by the longitudinally arranged direct acting draft rigging spring, a coöperating wedge or spreader device having inclined or wedging faces coöperating with inclined or wedging faces on the longitudinally movable friction blocks, said wedge being interposed between the draw-bar and the friction blocks, anti-friction rollers interposed between the incline or wedging faces of the friction blocks and the wedge, said wedge and said friction blocks having coöperating shoulders to keep the anti-friction rollers in place, when the direct acting spring is expanded and the wedge and friction blocks retracted or separated, said shoulders at the same time permitting the rollers to turn freely as anti-friction rollers when the wedge and friction blocks move to or from each other, so that all tendency of the friction devices to stick will be prevented, and so that the action of the friction devices will be certain and reliable both when the spring is compressed and when it releases or expands on removal of the load.

My invention further consists in the novel construction of parts and devices and in the novel combination of parts and devices herein shown and described.

In the accompanying drawing forming a part of this specification, Figure 1 is a central vertical longitudinal section of a direct acting friction spring draft rigging embodying my invention. Fig. 2 is a plan view partly in horizontal section and Fig. 3 is a cross section on line 3—3 of Fig. 1.

In the drawing, A represents the frame pieces of the car to which the draft rigging is applied, the same being as illustrated in the drawing metallic center sills.

B is the draw-bar, $B^1$ its yoke, C c longitudinally arranged direct acting draft rigging springs and D D, the customary side plates or stop castings, secured to the center sills or car frame pieces preferably by rivets d. These side plates or stop castings D have front and rear stops $d^1$ $d^2$ for the front and rear followers F $F^1$ to abut against.

$F^2$ is a longitudinally movable friction shell or case, preferably made integral with the rear follower $F^1$, and having interior longitudinally extending friction faces f, and coöperating with the longitudinally movable friction blocks G G, which have longitudinally extending exterior friction faces g g in sliding frictional engagement with the interior friction face f of the friction shell $F^2$. The friction shell $F^2$ at the portion thereof surrounding the friction blocks G G is preferably furnished with exterior strengthening ribs $f^2$, and it is also preferably provided with an opening $f^4$ at the top for removal and insertion of the springs C c. This enables the outer or larger spring C to be made of a larger diameter than the interior size of the portion of the friction shell which surrounds the friction blocks. The friction shell $F^2$ is preferably provided on each side at its bottom with laterally projecting guides or flanges $f^5$ to engage the customary removable guide or guides $D^1$ at the bottom of the side plates or stop castings D, which support the followers and other parts of the draft rigging and which are preferably removably secured to the side plates or stop castings D by bolts $d^3$.

The friction faces $g$ of the friction blocks G are chilled or furnished with chilled or hardened portions $g^1$, preferably to a depth of about one eighth or one quarter of an inch to prevent any tendency of the friction surfaces of the friction blocks and friction shell to cut each other, the friction shell being preferably of malleable iron or steel or other like metal.

The friction blocks G are furnished on their inner sides with inclines or wedge faces $g^2$, each furnished with a stop shoulder $g^3$, preferably of curved form, and which coöperates with a corresponding stop shoulder $g^4$ on the incline or wedge face $g^5$ of the wedge or spreader block $G^1$ which is interposed between the friction blocks G G and one of the followers, preferably the front follower, the spring C being preferably interposed between the friction blocks and the rear follower. The wedge or spreader block $G^1$ and the coöperating friction blocks G G are preferably also furnished with longitudinally extending guide faces $g^6$ $g^7$ on the friction blocks and $g^8$ $g^9$ on the wedge or spreader block. To keep the friction shell, friction blocks and wedge in assembled relation to each other for convenience in removing the same from and replacing them in the car, while at the same time permitting the friction shell, friction blocks and wedge to have their necessary longitudinal or telescopic movements in respect to each other, I provide the wedge or spreader block $G^1$ with a slot $g^{10}$ through which a bolt $g^{11}$ extends, this guide bolt being secured to the friction shell and fitting in suitable holes therein.

H H are the anti-friction rollers interposed between the inclines or wedge faces of the friction blocks and of the wedge or spreader block $G^1$.

As each friction block G has only one stop shoulder for the roller H, the roller is thus free to turn with a rolling movement on the incline or wedge face $g^5$ of the friction block and as the wedge or spreader block $G^1$ has on each of its inclines or wedge faces only one stop shoulder for the roller, it leaves the roller free to turn with a rolling movement on the incline or wedge face of the wedge or spreader block so that the rollers have a true anti-friction action in coöperation with the wedge and friction blocks and cause the friction devices to act with certainty, efficiency and reliability and without danger of sticking.

As in my invention the wedge $G^1$ has an antifriction roller on each of its wedging faces interposed between the wedge and the friction blocks, the wedge, which itself is interposed between the draw-bar and the friction devices, is under frictional engagement neither with the draw-bar nor with the friction blocks, and is consequently entirely free to instantly release or relieve the pressure, the instant it is relieved from the compressive strain of the draw-bar after each cushioning action. The roller or anti-frictional engagement between the wedge and the friction blocks entirely frees both friction blocks from any sticking frictional engagement with the surrounding friction shell when the draft rigging releases, so that a quick, certain and reliable release movement is always assured the moment the compressive load or strain is removed from the draw-bar after each cushioning action of the draft rigging or is sufficiently reduced below the power of the spring to enable the spring to react. This entirely prevents all danger of the friction devices sticking after one cushioning action or compressive blow and failing to properly release or restore the parts to position before another blow is received, and thus failing to properly cushion the succeeding blow.

I claim:—

1. In a friction draft rigging, the combination with the draw-bar, longitudinally arranged spring, followers and stops for the followers, of a longitudinally movable friction shell, longitudinally movable friction blocks inside said shell, said spring reacting at one end against said friction shell and at the other end against said friction blocks, a longitudinally movable wedge block between said friction blocks, and anti-friction rollers between said wedge block and said friction blocks having each a rolling action on both the wedge and one of the friction blocks, and said wedge having one of said anti-friction rollers on each of its wedging faces to prevent sticking of the friction devices and insure a quick and reliable release movement after each cushioning or compressive action, substantially as specified.

2. In a friction draft rigging, the combination with a draw-bar, its yoke, direct acting spring and followers, and stops for the followers, of a longitudinally movable friction shell, longitudinally movable friction blocks inside the shell, having on their inner sides inclines or wedge faces and longitudinally extending parallel guide faces, a longitudinally movable wedge block between said friction blocks having inclines or wedge faces and longitudinally extending parallel guide faces and anti-friction rollers between said wedge block and friction blocks having each a rolling action on both the wedge and one of the friction blocks, and said wedge having one of said anti-friction rollers on each of its wedging faces to prevent sticking of the friction devices and insure a quick and reliable release movement after each cushioning or compressive action, substantially as specified.

3. In a friction draft rigging the combination with the draw bar, spring and co-acting friction members, said spring reacting at one end against one of said friction members and at the other end against the other of said friction members, of a wedge and anti-friction rollers one on each side of the wedge and each having a rolling action on both the wedge and the adjacent friction member, substantially as specified.

4. In a friction draft rigging, the combination with the draw-bar yoke, of a direct acting spring, followers, stops for the followers, a longitudinally movable friction shell, longitudinally movable friction blocks within the shell having wedge faces, said spring reacting against said friction shell and friction blocks, a longitudinally movable wedge, anti-friction rollers between the wedge and friction blocks, one on each side of the wedge, and having a rolling action on both wedge and block, said wedge having a slot and said friction shell having a guide pin extending through the slot in the wedge whereby said spring, shell, friction block, wedge and rollers are all maintained in coöperative relation with each other, substantially as specified

JOHN F. O'CONNOR.

Witnesses
PEARL ABRAMS,
H. M. MUNDAY.